Patented July 14, 1953

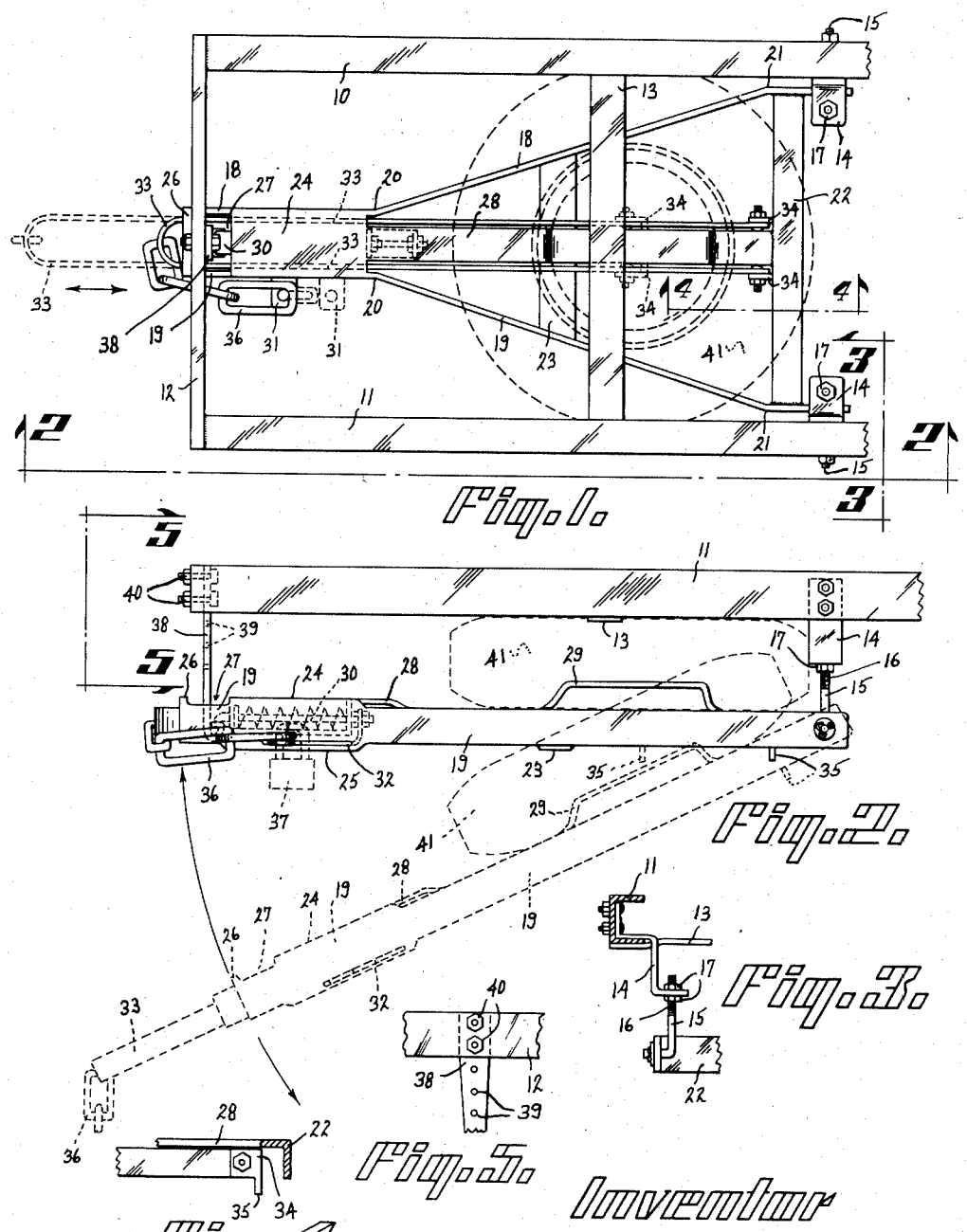

2,645,394

UNITED STATES PATENT OFFICE 2,645,394

SPARE TIRE HOLDER

Harry De Bord, Winterset, Iowa

Application May 8, 1950, Serial No. 160,620

7 Claims. (Cl. 224—42.22)

My invention relates to a device for holding the spare wheel and tire on a vehicle and is more particularly adapted for use on commercial vehicles where the spare tire holder is generally secured to the underside of the vehicle frame.

The type of spare tire holder on trucks, semi-trailers and the like that is mounted beneath the frame usually consists of a frame or brackets into and out of which the spare tire is placed or removed by manually supporting or lifting of the wheel and tire. Many spare tires carried in this manner are obviously large and heavy and their removal from the holder and the replacement therein of the tire removed from the vehicle often poses a difficult task that frequently requires the need for two men. Care must be exercised in removing and replacing these large tires in the spare tire holder lest the tire fall and injure someone. On some types of holders it is necessary for one person to lie on the ground and support the tire as the brackets are being loosened and in mounting a tire in such a holder it requires generally two persons to lift it into the holder where one person supports it while the other tightens the brackets. The weight of these large tires makes this a difficult job and one slip can cause considerable injury to one or both of the workers. Also, at times there may not be two persons available and in such a situation it may be impossible for one to remove the spare tire and mount the flat tire in its place in the holder.

With these problems in mind it is an object of my invention to provide a spare tire holder having an upper frame portion designed to be secured to the underside of the frame of a truck, semi-trailer or the like and having a spare tire supporting frame portion hingeably secured to the upper frame with a lever handle adjustable as to length whereby one person can easily remove a spare tire from the tire holder or mount it therein.

A further object of this invention is to provide a spare tire holder of the above class that can be adjusted to carry tires of different sizes.

A still further object of this invention is to provide a holder for spare tires having the characteristics above described that does not require the use of any tools when removing a tire therefrom or mounting one therein.

A still further object of this invention is to provide a spare tire holder affording the above recited advantages that is economical in manufacture and durable in construction.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of my device with the broken lines at the right representing a spare tire and the broken lines at the left indicating the adjustability of the lever handle, Fig. 2 is a side view of this spare tire holder taken from the line 2—2 of Fig. 1 with the broken lines indicating the tire supporting portion in different position, Fig. 3 is a cross-sectional view of this device taken on the line 3—3 of Fig. 1, and Fig. 4 is a cross-sectional view taken on the line 4—4 of Fig. 1, Fig. 5 is a front fragmentary center view of this device taken from the line 5—5 of Fig. 2.

Referring to the drawings my invention embodies the use of a rectangular metal upper frame consisting of the side members 10 and 11 that are each channel shaped in cross section as shown in Fig. 3, a front bar member 12 and a like bar member (not shown) at the rearwardly end of the frame. A tire holding bar 13 extends transversely between the frame sides 10 and 11 and secured to the underside thereof at a point between the longitudinal center of the sides and their rearwardly ends as shown in Fig. 1. This upper frame is secured in horizontal position as shown in Fig. 2 to the underside of the frame on a truck, semi-trailer or the like in any suitable manner and at any suitable place thereon.

The numeral 14 designates a pair of like bracket members oppositely disposed and secured within the channel portions of the respective frame sides 10 and 11 near the rearwardly end thereof as shown in Fig. 3, and to the lower end of each of these brackets there is an L-bolt 15 vertically adjustably secured. The upper ends of each of the bolts 15 are threaded as at 16 to receive the nuts 17 as shown in Fig. 3 which serves as a means to vertically adjust the bolts in the brackets 14.

A lower Y-shaped frame has the two bar side members 18 and 19 extending from its forwardly end in parallel spaced relation rearwardly to the bend points 20 and thence diverging to the bend points 21 and then continuing substantially parallel to each other. A length of angle iron bar 22 extends between the rearwardly end portions of the bar members 18 and 19 and is rigidly secured thereto as shown in Fig. 1. This bar is so positioned that the rearwardly ends of the frame sides 18 and 19 extend rearwardly therefrom. These extensions are each apertured and are vertically hingeably mounted respectively on the lower end of the L-bolts 15 as shown in Figs. 2 and 3. At a point approximately midway between the bend points 20 and 21 a stop bar 23 extends between the Y-frame sides 18 and 19 and is rigidly secured thereto.

On the forward portion of the Y-frame where the sides 18 and 19 are in parallel spaced relation I have secured a top portion 24 and a bottom portion 25 between the top and bottom respectively of the sides 18 and 19 to provide the rectangular enclosed frame portion extending from the bend points 20 forwardly toward but not to the forward ends of the frame sides 18 and 19. A guide bar 26 joins the top forward ends of the Y-frame sides 18 and 19 to create the space 27 that is framed on two sides by the sides 18 and 19, on the rear by the forward edges of the top 24 and bottom 25 and on the front by the guide bar 26 as shown in Figs. 1 and 2.

A support bar 28 that is integral with the top 24 extends rearwardly therefrom to the angle iron bar 22 and is secured thereto. A section of this bar 28 has the elevated portion 29 as shown in Fig. 2. Secured within the enclosed portion on the forwardly section of the Y-frame is a spring loaded latch 30 that normally extends into the opening 27 and can be withdrawn therefrom by means of the manually operated control bar 31 which is slidable in the slot 32 in the frame side 19. This is a one-way latch which automatically yields to pressure from above but cannot be released by pressure from below without movement of the control bar 31.

The numeral 33 designates a lever lifting arm or handle that is formed from a length of bar material which is bent at its center so that the resulting two length portions extend in substantially parallel spaced relation as shown in Fig. 1. This arm is slidably mounted through the enclosed portion at the front of the Y-frame and the edges of the free ends thereof are embraced by a U-plate 34 that has a downwardly extending integral lip 35. Thus mounted this lever handle can be extended forwardly of both the upper and lower frames as indicated by the broken lines in Fig. 1 and serves in effect as an extension of the lower Y-frame to provide a greater leverage means at times for lowering and raising the same in relation to the upper frame. In extending this arm to the front the lip 35 will engage the stop bar 23 to limit its forward movement and when moved rearwardly, the plate 34 will engage one side of the angle iron bar 22 which serves as a stop means to limit its movement to the rear. A link chain or the like 36 is secured at one end to the forwardly U-portion of the lever lifting arm and its other end is designed to be secured to the control bar 31 at times by means of a lock 37 or the like.

Extending downwardly from the central portion of the front bar 12 on the upper frame is the latch receiving arm 38. This latch arm is provided with a plurality of openings 39 in vertical spaced relationship so that the distance between the lower end of this latch arm and the frame bar 12 can be selectively varied by securing the arm 38 to the bar 12 at times through different openings 39 by means of the bolts and nuts 40. This latch receiving arm is positioned so that when the forward ends of the two frames are moved towards each other it will extend into the space 27 and automatically become interlocked with the latch 30. The numeral 41 designates a spare tire and wheel resting on the diverging arms of the Y-frame so that the elevated portion 29 of the support bar 28 extends between diametrically opposite points on the periphery of the rim carrying the spare tire.

In operation the upper frame is secured to the underside of a truck frame or other like vehicle. The lower Y-shaped frame being hingedly mounted to the upper frame can be dropped downwardly by releasing the latch 30 which is accomplished by manually moving the control bar 31 to the rear. When this is done the Y-frame will be in position as shown by broken lines in Fig. 2. If a tire is in this holder when the Y-frame is released, the lever arm can be extended forwardly so that one person holding the lever can ease the frame downwardly so as not to dump the tire which might injure him if it dropped loose. The tire is merely rested on the diverging arms or sides of the Y-frame and the elevated portion 29 of the support bar 28 which extends between opposite points on the periphery of the rim serve as a stop means to prevent the tire from sliding when it is being lowered or raised. Once the Y-frame is lowered, one person can then maneuver it off of the holder. In placing a tire on the holder, the procedure outlined is merely reversed, that is with the Y-frame down, a tire can be slid into position if it is too heavy to lift and then by means of the extended lever arm, one person can elevate the Y-frame to the point where the latch arm and one way latch automatically become interlocked. Thus, locked, the Y-frame cannot be moved without releasing the latch by means of the control bar. By means of the link chain and lock as described, the lever arm is prevented from extending while the vehicle is in motion and the control bar 31 is held against rearwardly movement so that the holder is locked and the tire cannot be removed. When the Y-frame is raised with a tire on it, the tire holding bar 13 on the upper frame will engage the tire so that the tire is tightly held between the two frames by frictional contact. As pointed out in the specification the bolts 15 and latch arm 38 are vertically adjustable and this makes it possible to adjust this holder to carry tires of different sizes. It is pointed out that this spare tire holder when constructed as described will securely hold the tire in place and the tire can be quickly and easily removed therefrom or placed therein without the need for any tool.

Some changes may be made in the construction and arrangement of my spare tire holder without departing from the real spirit and purpose of my invention, and it is my intention to cover by my claims, any modified forms of structure or use of mechanical equivalents which may be reasonably included within their scope.

I claim:

1. In a spare tire holder, a rectangular frame member, a Y-shaped frame having its diverging end portions hingedly vertically adjustably secured at opposite points at one end of said rectangular frame member, a bar member extending transversely between two opposite sides of said rectangular frame, a bar member extending transversely between the diverging arms of said Y-frame in the same direction as said first mentioned bar member, a one way spring loaded latch on the end of said Y-frame opposite its hinged end, a latch receiving arm vertically adjustably secured to said rectangular frame member at a point where it is capable of becoming interlocked with said latch, at times, means for manually releasing said latch from engagement with said latch receiving arm, an elongated lever lifting arm slidably mounted on said Y-frame so as to be capable of being extended outwardly from said Y-frame at times, stop means to limit the movement of said lever arm in one direction, a second stop means to limit the movement of said lever arm in the opposite direction; said stop means respectively operating to limit the movement of said lever arm in opposite directions, and a flexible locking means secured at one end to said lever arm and capable of being secured to said means for releasing said latch whereby said latch is locked against release and at the same time said lever arm is locked against any sliding movement.

2. In a spare tire holder, a rectangular frame member, a Y-shaped frame having its diverging end portions hingedly vertically adjustably secured at opposite points to one end of said rectangular frame member, a bar member extending transversely between the diverging end portions of said Y-frame and secured thereto, a second bar member extending transversely between said diverging portions of said Y-frame and secured thereto in spaced relation to said first mentioned bar member, a tire supporting bar extending from the central portion of said first mentioned bar to the intersection of said diverging portions; said tire supporting bar having an elevation portion between its ends, a bar member extending transversely between the ends of opposite sides of said rectangular frame member and secured thereto so as to extend in the same direction as said first two mentioned bars, a one way spring loaded latch on the end of said Y-frame opposite its hinged end, a latch receiving arm vertically adjustably secured to said rectangular frame member at a point where it is capable of becoming interlocked with said latch, at times, means for manually releasing said latch from engagement with said latch receiving arm, an elongated lever lifting arm slidably mounted on said Y-frame so as to be capable of being extended outwardly from said Y-frame at times, stop means consisting of said first mentioned bar to limit the movement of said lever arm in one direction, a second stop means consisting of said second bar to limit the movement of said lever arm in the opposite direction; said stop means respectively operating to limit the movement of said lever arm in opposite directions, and a flexible locking means secured at one end to said lever arm and capable of being secured to said means for releasing said latch whereby said latch is locked against release and at the same time said lever arm is locked against any sliding movement.

3. In a spare tire holder, a rectangular frame member, a Y-shaped frame having its diverging end portions hingedly vertically adjustably secured at opposite points at one end of said rectangular frame member, a bar member extending transversely between two opposite sides of said rectangular frame, a bar member extending transversely between the diverging arms of said Y-frame in the same direction as said first mentioned bar member, a one way spring loaded latch on the end of said Y-frame opposite its hinged end, a latch receiving arm vertically adjustably secured to said rectangular frame member at a point where it is capable of becoming interlocked with said latch, at times, means for manually releasing said latch from engagement with said latch receiving arm, an elongated lever lifting arm slidably mounted on said Y-frame so as to be capable of being extended outwardly from said Y-frame at times, stop means to limit the movement of said lever arm in one direction, a second stop means to limit the movement of said lever arm in the opposition; said stop means respectively operating to limit the movement of said lever arm in opposite directions.

4. In a spare tire holder, a rectangular frame member, a Y-shaped frame having its diverging end portions hingedly vertically adjustably secured at opposite points at one end of said rectangular frame member, a bar member extending transversely between two opposite sides of said rectangular frame, a bar member extending transversely between the diverging arms of said Y-frame in the same direction as said first mentioned bar member, a latch bolt means on the end of said Y-frame opposite its hinged end, a latch bolt receiving arm vertically adjustably secured to said rectangular frame member at a point where it is capable of becoming interlocked with said latch, at times, means for manually releasing said latch from engagement with said latch receiving arm, an elongated lever lifting arm slidably mounted on said Y-frame so as to be capable of being extended outwardly from said Y-frame at times, stop means to limit the movement of said lever arm in one direction, a second stop means to limit the movement of said lever arm in the opposite direction; said stop means respectively operating to limit the movement of said lever arm in opposite directions, and a flexible locking means secured at one end to said lever arm and capable of being secured to said means for releasing said latch whereby said latch is locked against release and at the same time said lever arm is locked against any sliding movement.

5. In a spare tire holder, a first frame member, a second frame member hingedly secured at one end to said first frame member, the other end of said second frame member being longitudinally extensible to provide a greater leverage means at times for lowering and raising the same in relation to said first frame member, a locking means on the end of said second frame member opposite its hinged end, a lock receiving arm vertically secured to said first frame member at a point where it is capable of becoming interlocked with said locking means, means for releasing said locking means from engagement with said lock receiving arm, and a second locking means capable of holding said first mentioned locking means against accidental release and at the same time preventing any longitudinal movement of the extensible end of said second frame member.

6. In a spare tire holder, a first frame member, a second frame member hingedly vertically adjustably secured at one end to said first frame member, the other end of said second frame member being longitudinally extensible to provide a greater leverage means at times for lowering and raising the same in relation to said first frame member, a locking means on the end of said second frame member opposite its hinged end, a lock receiving arm vertically adjustably secured to said first frame member at a point where it is capable of becoming interlocked with said locking means, means for manually releasing said locking means from engagement with said lock receiving arm, and a flexible locking means capable of holding said first mentioned locking means against accidental release and at the same time preventing any longitudinal movement of the extensible end of said second frame member.

7. In a spare tire holder, a first frame member, a second frame member hingedly secured at one end to said first frame member, a longitudinally adjustable lever arm slidably mounted on said second frame member to provide an extension therefor, a stop means to limit the movement of said lever arm in one direction, a second stop means to limit the movement thereof in the other direction, a locking means on the end of said second frame member opposite its hinged end, a lock receiving arm vertically secured to said first frame member at a point where it is capable of becoming interlocked with said locking means, means for releasing said locking means from engagement with said lock receiving arm, and a second locking means capable of holding said first mentioned locking means against accidental release and at the same time preventing any longitudinal movement of the extensible end of said second frame member.

HARRY DE BORD.

References Cited in the file of this patent

UNITED STATES PATENTS

| Number | Name | Date |
|---|---|---|
| 1,349,581 | Peltier | Aug. 17, 1920 |
| 1,672,356 | Wasserfallen | June 5, 1928 |
| 1,761,916 | Hebner | June 3, 1930 |
| 1,813,094 | Appel | July 7, 1931 |
| 1,877,887 | Fulton | Sept. 20, 1932 |
| 2,214,937 | Ragsdale | Sept. 17, 1940 |
| 2,449,544 | Ballard | Sept. 21, 1948 |
| 2,547,083 | Lundgren | Apr. 3, 1951 |

FOREIGN PATENTS

| Number | Country | Date |
|---|---|---|
| 643,181 | France | May 10, 1928 |
| 531,648 | Great Britain | Jan. 8, 1941 |